(12) United States Patent
Huang et al.

(10) Patent No.: US 10,154,150 B2
(45) Date of Patent: Dec. 11, 2018

(54) NETWORK SWITCHING DETECTION FOR TOLL-FREE DATA SERVICE PROVISION

(71) Applicant: Verizon Patent and Licensing Inc., Arlington, VA (US)

(72) Inventors: Jian Huang, Sudbury, MA (US); Susan Kelly, Maynard, MA (US); Gong Zhang, Waltham, MA (US); Fnu Bongu Huma Shankar Rao, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 390 days.

(21) Appl. No.: 15/172,262

(22) Filed: Jun. 3, 2016

(65) Prior Publication Data

US 2017/0353609 A1 Dec. 7, 2017

(51) Int. Cl.
| | |
|---|---|
| *H04M 15/00* | (2006.01) |
| *H04W 4/24* | (2018.01) |
| *H04W 48/18* | (2009.01) |
| *H04M 15/08* | (2006.01) |
| *H04W 48/16* | (2009.01) |
| *H04W 88/06* | (2009.01) |
| *H04W 92/06* | (2009.01) |

(52) U.S. Cl.
CPC ......... *H04M 15/39* (2013.01); *H04M 15/08* (2013.01); *H04M 15/09* (2013.01); *H04M 15/46* (2013.01); *H04M 15/58* (2013.01); *H04M 15/8083* (2013.01); *H04W 4/24* (2013.01); *H04W 48/16* (2013.01); *H04W 48/18* (2013.01); *H04W 88/06* (2013.01); *H04W 92/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,068,776 | B1 * | 6/2006 | Gamble | H04M 11/007 |
| | | | | 379/100.14 |
| 9,392,123 | B1 * | 7/2016 | Yin | H04M 15/09 |
| 9,398,171 | B1 * | 7/2016 | Yin | H04M 15/8083 |
| 9,402,002 | B1 * | 7/2016 | Hao | H04M 15/8214 |
| 9,674,685 | B2 * | 6/2017 | Buonomo | H04W 4/24 |
| 9,894,521 | B2 * | 2/2018 | Yin | H04W 12/06 |
| 9,924,339 | B2 * | 3/2018 | Bongu Huma Shankar Rao | |
| | | | | H04M 15/8214 |
| 9,924,340 | B1 * | 3/2018 | Ren | H04L 43/0876 |
| 9,973,340 | B2 * | 5/2018 | Zhang | H04L 9/3247 |
| 2005/0101289 | A1 * | 5/2005 | Halsell | H04M 15/08 |
| | | | | 455/406 |

(Continued)

*Primary Examiner* — Steven Kelley

(57) ABSTRACT

A device determines a connection status of a Public Land Mobile Network (PLMN) communication interface and a wireless Local Area Network (LAN) communication interface, and stores the connection status in a queue. The device waits, subsequent to storing the connection status, for expiration of a time delay; and retrieves, subsequent to the expiration of the time delay, the connection status or another connection status from the queue. The device sends, based on the retrieved connection status or the other connection status, a service validation request to a server associated with the PLMN, and receives from the server, in response to the service validation request, a validation response that authorizes service delivery to the device via a PLMN.

20 Claims, 13 Drawing Sheets

(56) References Cited

U.S. PATENT DOCUMENTS

| | | | | |
|---|---|---|---|---|
| 2006/0063544 A1* | 3/2006 | Zhao | .............. | H04L 69/28 |
| | | | | 455/510 |
| 2006/0182137 A1* | 8/2006 | Zhou | .............. | G06F 9/544 |
| | | | | 370/428 |
| 2012/0046013 A1* | 2/2012 | Bauman | ........... | H04M 3/50 |
| | | | | 455/411 |
| 2012/0166617 A1* | 6/2012 | Chang | ............ | H04W 76/02 |
| | | | | 709/224 |
| 2015/0011180 A1* | 1/2015 | Buonomo | ....... | H04W 4/24 |
| | | | | 455/406 |
| 2015/0065134 A1* | 3/2015 | Vandemoere | ..... | H04W 36/0022 |
| | | | | 455/436 |
| 2015/0334248 A1* | 11/2015 | Yin | .............. | H04M 15/09 |
| | | | | 455/406 |
| 2015/0334249 A1* | 11/2015 | Yin | .............. | H04L 12/1435 |
| | | | | 455/406 |
| 2016/0028899 A1* | 1/2016 | Xiao | ........... | H04M 15/68 |
| | | | | 455/406 |
| 2016/0149923 A1* | 5/2016 | Zhang | ........... | G06Q 20/40 |
| | | | | 726/4 |
| 2017/0034775 A1* | 2/2017 | Mandanapu | ........ | H04W 4/24 |
| 2017/0163806 A1* | 6/2017 | Shanmugam | ....... | H04M 3/5183 |

* cited by examiner

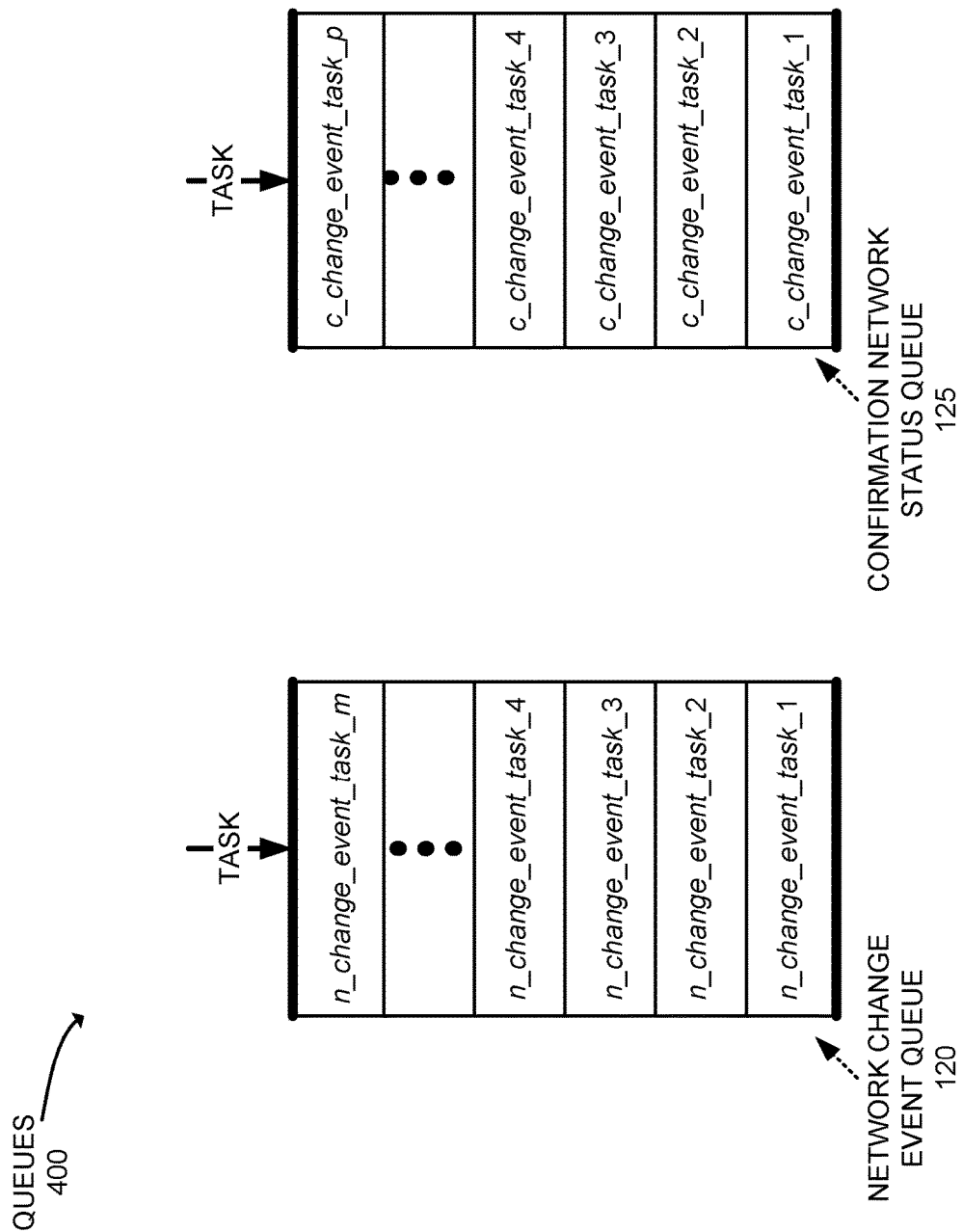

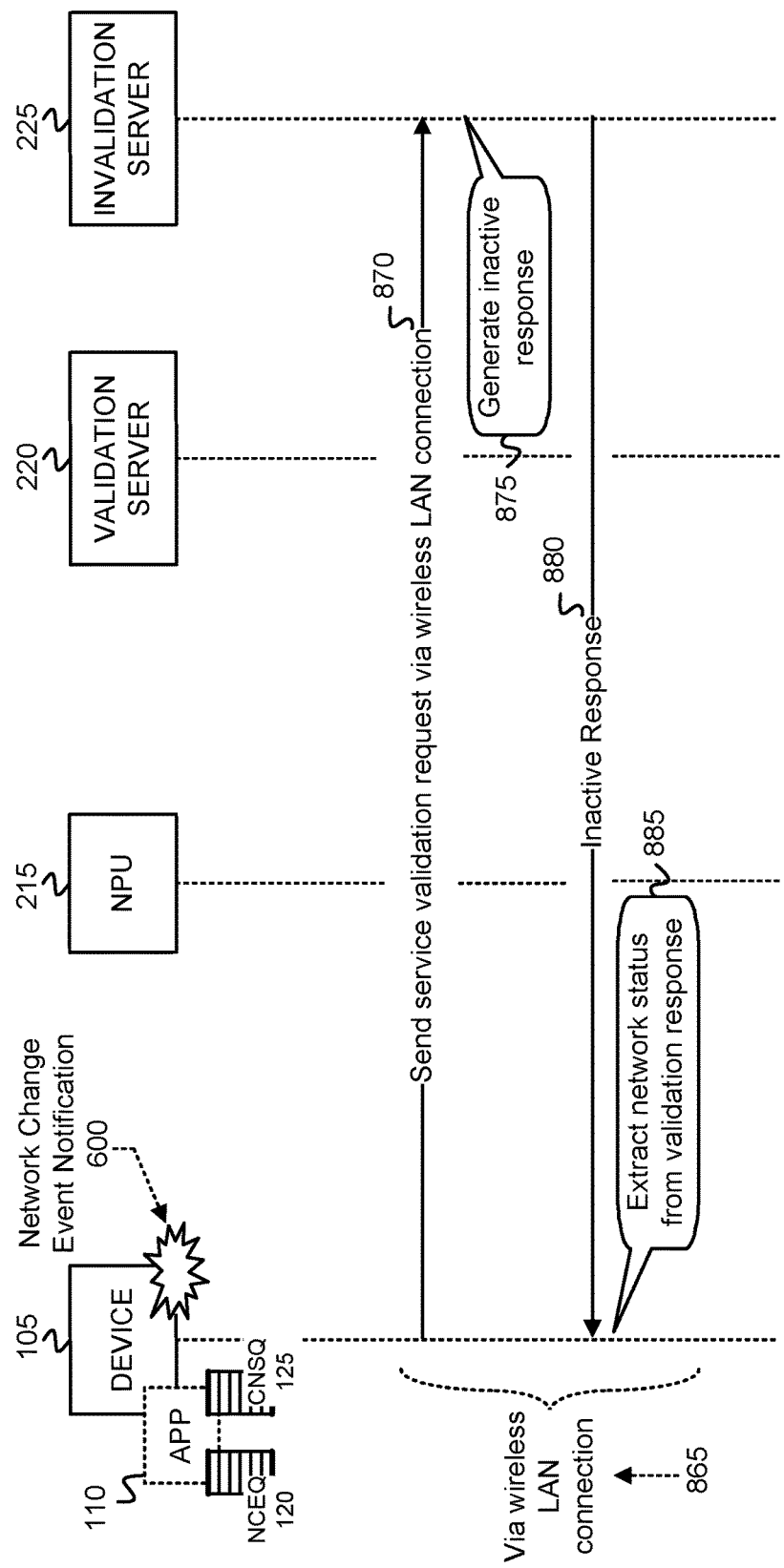

NETWORK SWITCHING DETECTION FOR TOLL-FREE DATA SERVICE PROVISION

BACKGROUND

Wireless data plans, offered by wireless network service providers, allow mobile subscribers to access content and/or applications ("apps") through mobile devices. Data usage for end users is typically charged to an account associated with an end user. The end user's account may have a periodic limit on total data usage, for example on wireless networks (e.g., a 2 Gigabytes per month data plan). End users on networks that have periodic limits for data usage often arrange their data usage behavior to avoid overages associated with periodic limits on data usage. For example, an end user may curtail online shopping, or other activity when they are approaching or have exceeded the periodic limit.

BRIEF DESCRIPTION OF THE DRAWINGS

FIG. 4 depicts an exemplary implementation of queues that include the network change event queue and the confirmation network status queue of FIG. 1;

FIGS. 8A-8C are exemplary messaging diagrams associated with the process of FIGS. 7A and 7B.

DETAILED DESCRIPTION OF THE PREFERRED EMBODIMENTS

Figure 1:
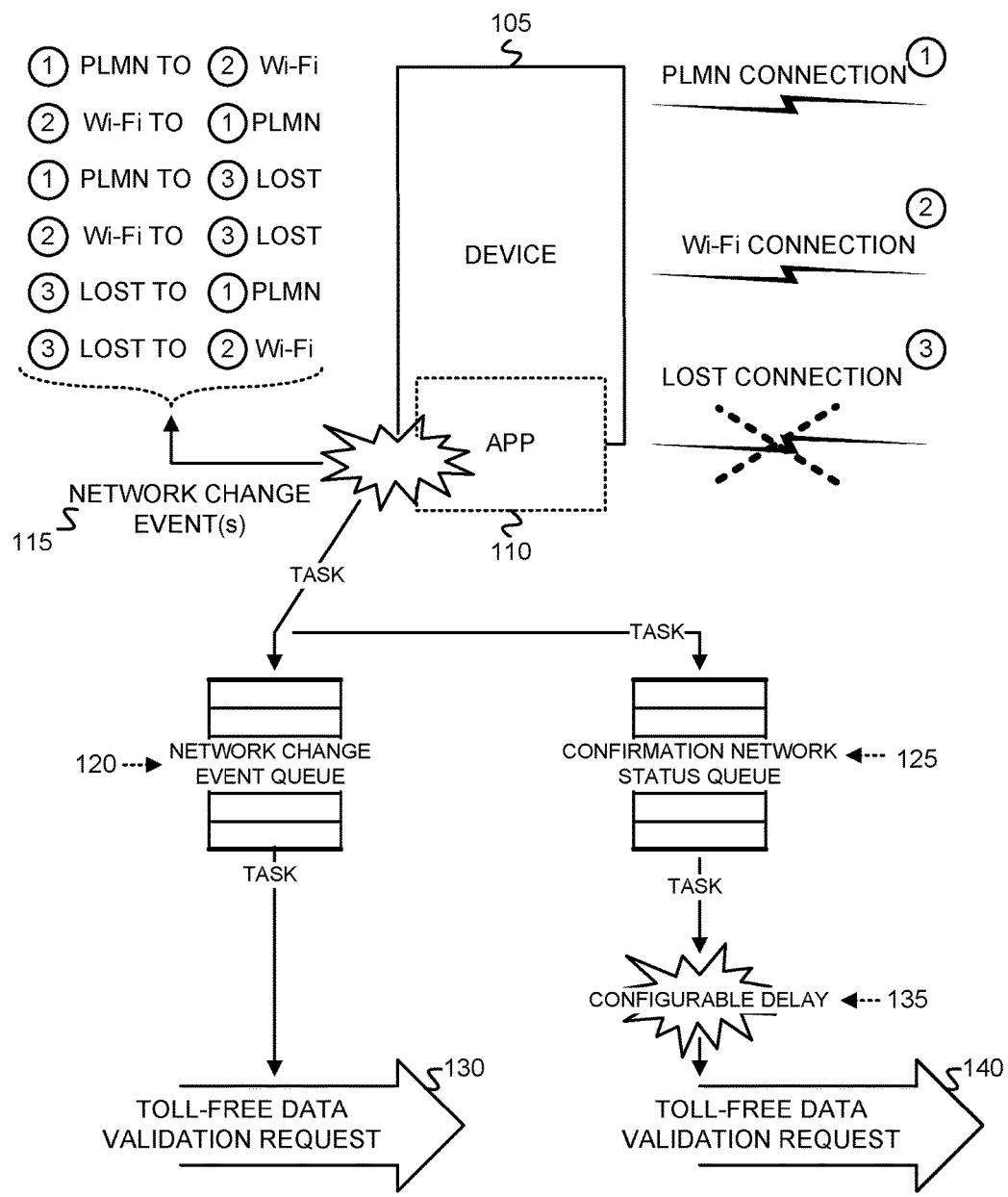
FIG. 1 is a diagram that depicts an overview of the detection of wireless network switching at a wireless device for the selective provision of a network service via a Public Land Mobile Network to the wireless device.

The following detailed description refers to the accompanying drawings. The same reference numbers in different drawings may identify the same or similar elements. The following detailed description does not limit the invention.

Toll-Free Data (TFD) service allows mobile subscribers to access content without impacting their monthly wireless data plan for at least an allocated quota of free network usage (e.g., a limited quota of data usage that is not charged to the mobile subscriber's personal account, but is charged to the network service provider and/or the content provider that delivers the content). TFD service enables mobile subscribers to reduce the data consumption billed to their mobile accounts when receiving media content from content providers, and the content providers can increase their digital presence and potentially increase their product sales by offering their media content via TFD service. TFD service, therefore, offers a data consumption model that can benefit consumers, sponsoring companies, and network service providers.

A network operator of a Public Land Mobile Network (PLMN) may permit toll-free delivery of data to wireless devices via the PLMN. Toll-free data delivery may enable, for example, an Internet content provider to sponsor content accessed by a user of a wireless device via the PLMN, such that the user's account is not charged for delivery of the data to or from the wireless device. Exemplary embodiments described herein enable one or more services (e.g., a toll-free data service), to be provided to a wireless device via a PLMN, based on the connection statuses of at least two different wireless communication interfaces at the wireless device. When a wireless device switches from having an active connection to the PLMN, to an active connection to a wireless local area network (LAN), or vice versa, instability in the active connection may exist over a period of time. During this period of instability, the wireless device may not be able to determine which of its wireless connections to use as an active connection for data communication due to the indeterminate state of the wireless connections. Exemplary embodiments described herein implement multiple queues for storing and retrieving tasks associated with network change event notifications, and a configurable delay period that enables stability in the active wireless connection to be achieved prior to sending a final toll-free data service validation request for communication of data toll-free via the PLMN at the wireless device. A first process (i.e., thread) may be associated with a first "network change event queue" that stores tasks related to network change event notifications for which a device instantly sends an initial service validation request when a particular network change event notification is received. An example of this first process is described below with respect to FIGS. 5A and 5B. A second process (i.e., thread), which may run as a background process, may be associated with a second "confirmation network status queue" that stores tasks related to a received network change event notification, and which sends a service validation request subsequent to a configurable delay period after receipt of the network change event notification and after the initial service validation request is sent. An example of this second process is described below with respect to FIGS. 7A and 7B. Use of the configurable delay in the second process permits the stability in the active wireless connection to be achieved prior to sending the final toll-free service validation request.

FIG. 1 is a diagram that depicts an overview of the detection of wireless network switching at a wireless device for the selective provision of a network service (e.g., a toll-free data service) via a PLMN to the wireless device. As shown, a device 105 may establish and maintain a connection with the PLMN ("PLMN connection" identified with a "1" within a circle) and/or may establish and maintain a connection with a wireless LAN ("Wi-Fi connection" identified with a "2" within a circle). The wireless LAN may include, for example, a "Wi-Fi" network that is based on the Institute of Electrical and Electronics Engineers' (IEEE) 802.11 standards. Device 105 may establish and maintain the PLMN connection as the only wireless connection, the Wi-Fi connection as the only wireless connection, or both the PLMN connection and Wi-Fi connection simultaneously. Alternatively, a "lost connection" (identified with a "3" within a circle) condition may exist at device 105 where the PLMN connection and/or the Wi-Fi connection have been temporarily lost such that only one wireless connection, or no wireless connection, exists between device 105 and an external network(s).

An application (app) 110, installed at device 105, may be executed to monitor the connection status of the PLMN connection and the Wi-Fi connection. App 110 may generate a notification for each network change event 115 that occurs at device 105. For example, device 105 may switch from the PLMN connection to the Wi-Fi connection, from the Wi-Fi connection to the PLMN connection, from the PLMN connection to a "lost" connection, from the Wi-Fi connection to the "lost" connection, from a "lost" connection to the PLMN connection, or from a "lost" connection to the Wi-Fi connection. As each network change event occurs, app 110 identifies the network change event, and places a corresponding network change event task within a network change event queue 120. Network change event queue 120 may include, for example, a First-In-First-Out (FIFO) queue, implemented in memory, which stores a task associated with each network change event identified by app 110. For example, if app 110 identifies that device 105 has switched from a Wi-Fi connection to a PLMN connection, then app 110 stores a task in network change event queue 120 that identifies the particular network change. Subsequent to storing the task in network change event queue 120, app 110 may retrieve the task from network change event queue 120, and may send a first toll-free data service validation request 130 to an external server associated with the PLMN. The toll-free data service validation request requests validation of device 105 for sending and/or receiving data via the PLMN toll-free (i.e., no charge to the user of device 105).

After sending the first toll-free data service validation request 130, app 110 may store a new task, corresponding to the identified network change event, in a confirmation network status queue 125. Confirmation network status queue 125 may include, for example, a First-In-First-Out (FIFO) queue, implemented in memory, which stores a task associated with each network change event identified by app 110. Subsequent to storing the new task in confirmation network status queue 125, app 110 may wait a configurable delay period 135 and, upon expiration of the configurable delay, retrieve a task from confirmation network status queue 125. During the configurable delay period, one or more additional network change events may occur such that the previous network change event task stored in queue 125 is replaced with a most recent network change event task. App 110 then sends a second toll-free data service validation request 140 to the external server associated with the PLMN, with the second toll-free data service validation request requesting validation of device 105 for sending and/or receiving data via the PLMN toll-free (i.e., no charge to the user of device 105). The configurable delay period, therefore, enables the wireless connection state to stabilize prior to the second toll-free data service validation request being sent to the external server.

Figure 2:
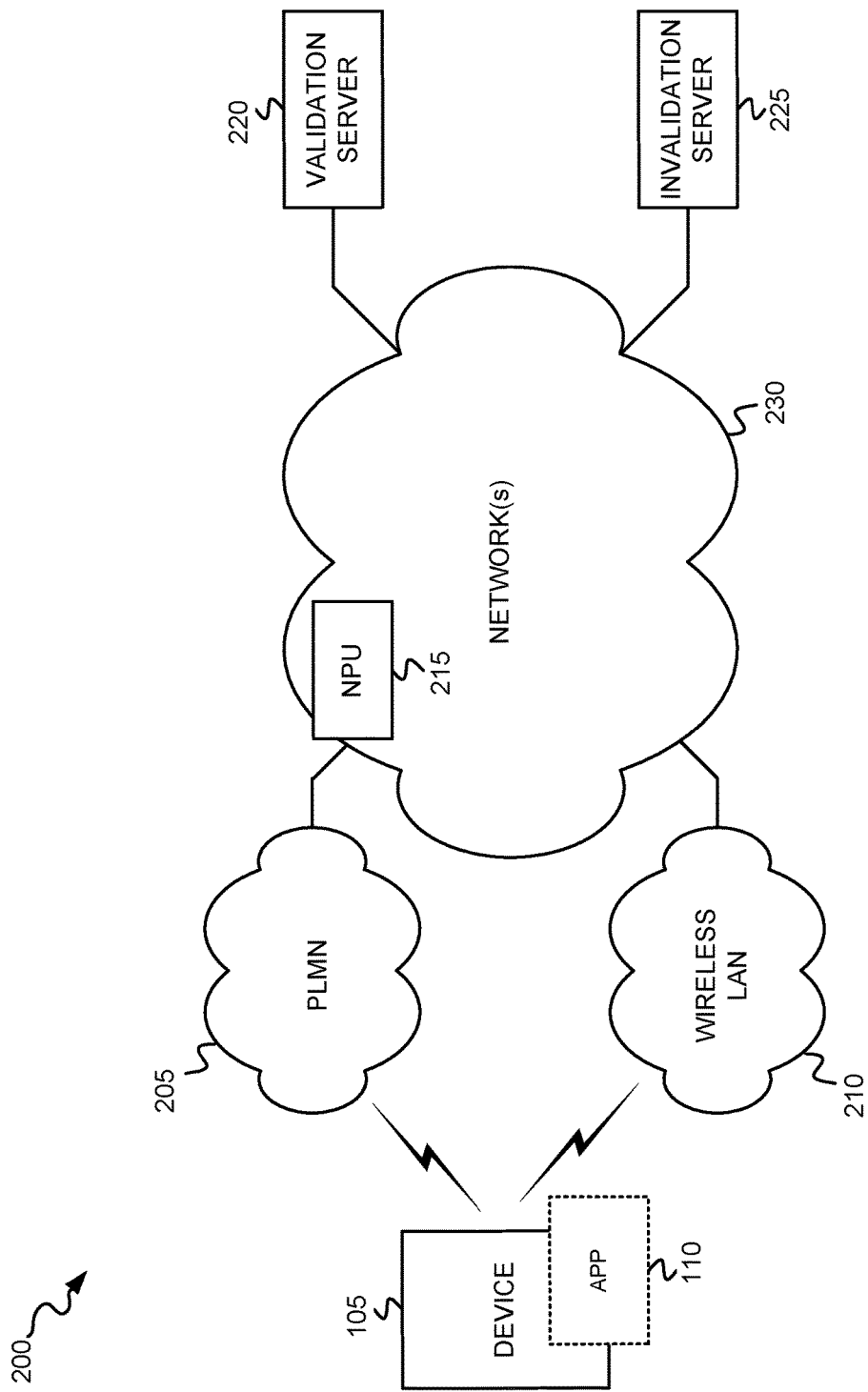
FIG. 2 is a diagram that depicts an exemplary network environment in which a wireless device detects a switching between wireless connections with different wireless networks for the selective provision of a network service via a Public Land Mobile Network to the wireless device.

FIG. 2 is a diagram that depicts an exemplary network environment 200 in which a wireless device 105 detects a switching between wireless connections that wireless device 105 has with different wireless networks for the selective provision of a network service (e.g., a toll-free network data service) via a Public Land Mobile Network (PLMN) to the wireless device 105. As shown, network environment 200 includes a wireless device 105, a PLMN 205, a wireless LAN 210, a Network Processing Unit (NPU) 215, a validation server 220, an invalidation server 225, and a network(s) 230.

Device 105 may include any type of electronic device that includes a first wireless communication interface (i.e., transceiver) for communicating via PLMN 205, and a second wireless communication interface (i.e., transceiver) for communicating via another wireless link or wireless network, such as, for example, wireless LAN 210. The first wireless transceiver may include any type of wireless communication interface capable of communicating with one or more PLMN networks via PLMN network protocols (e.g., via 4G Long Term Evolution (LTE)). The second wireless communication interface may include a wireless communication interface capable of communicating via the other wireless link or other wireless network. In one example, the second wireless communication interface may include a Wi-Fi (IEEE 802.11 standard) transceiver. Device 105 may include one or more additional types of wireless communication interfaces capable of communicating via a short range wireless protocol such as, for example, Bluetooth, Insteon, Infrared Data Association (IrDA), Wireless USB, Z-Wave, ZigBee, and/or a Body Area Network (BAN).

Device 105 may include, for example, a cellular telephone (e.g., a smart phone); a wearable computer device (e.g., a wrist watch, glasses, etc.); a personal digital assistant (PDA); a palmtop, laptop, or tablet computer; a media playing device; a game playing device, or a digital camera device. Device 105 stores and executes app 110 that monitors network change events occurring at device 105, stores and retrieves tasks corresponding to the network change events from queues 120 and 125 in memory, and sends toll-free data service validation requests to an external server based on the exemplary process described below with respect to the exemplary processes of FIGS. 5A and 5B, and FIGS. 7A and 7B.

PLMN 205 includes one or more PLMN networks of any type, such as, for example, a Code Division Multiple Access (CDMA) 2000 PLMN, a Global System for Mobile Communications (GSM) PLMN, an LTE PLMN (e.g., 4G LTE PLMN) and/or other types of PLMNs not specifically described herein.

Wireless LAN 210 includes one or more wireless LANs of any type, such as, for example, a Wi-Fi network that operates according to the IEEE 802.11 standard. Wireless LAN 210 may, however, include other types of wireless networks, such as other types of wireless LANs and/or Personal Area Networks (PANs).

NPU 215 includes one or more network devices that receives toll-free data service validation requests, and forwards the validation requests to validation server 220.

Validation server 220 includes one or more network devices that receives forwarded toll-free validation requests from NPU 215, validates the requests, and returns validation responses that authorize toll-free data service to wireless device 105 via PLMN 205.

Invalidation server 225 includes one or more network devices that receives toll-free data service validations requests from wireless device 105, validates the requests, and returns validation responses that reject toll-free data service to wireless device 105 via PLMN 205. In one exemplary embodiment, server 220 and server 225 may be implemented within a same network device(s).

Network(s) 230 includes one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, and/or a cable network (e.g., an optical cable network).

The configuration of the components of network environment 200 depicted in FIG. 2 is for illustrative purposes only, and other configurations may be implemented. Therefore, network environment 200 may include additional, fewer and/or different devices or components, that may be configured differently, than depicted in FIG. 2. For example, though only a single device 105, and app 110, is depicted in FIG. 2, multiple devices 105, each having its own app 110, may exist in network environment 200.

Figure 3:
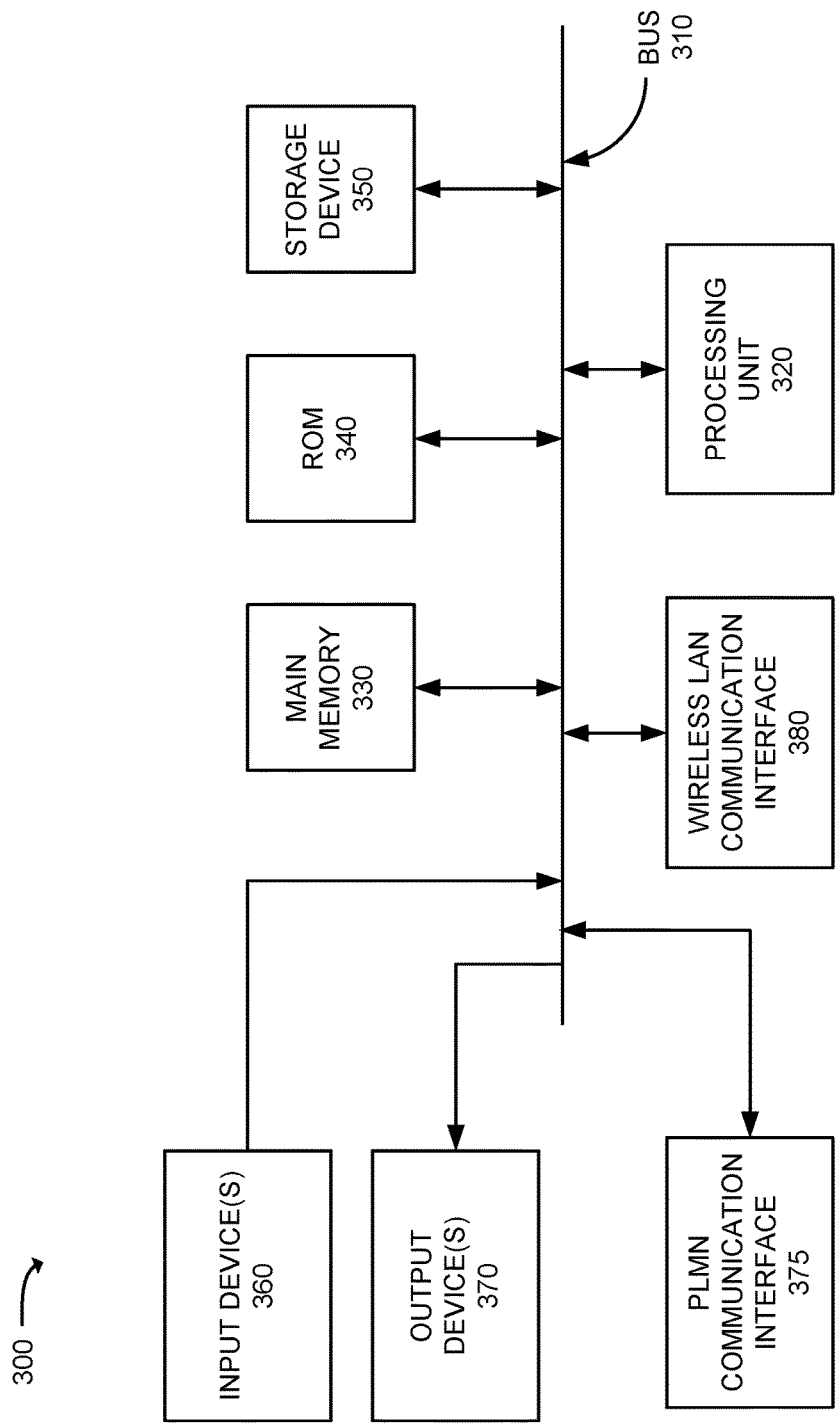
FIG. 3 is a diagram of exemplary components of a device that may correspond to the device, the Network Processing Unit, validation server, and/or invalidation server depicted in FIG. 2.

FIG. 3 is a diagram of exemplary components of a device 300. Device 105, NPU 215, validation server 220, and/or invalidation server 225 may each include the same, or similar components, in a same or similar configuration to that depicted in FIG. 3. Device 300 may include a bus 310, a processing unit 320, a main memory 330, a read only memory (ROM) 340, a storage device 350, an input device(s) 360, an output device(s) 370, a PLMN communication interface 375, and a wireless LAN communication interface 380.

Bus 310 may include a path that permits communication among components of device 300. Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit a user or operator to input information to device 300, such as, for example, a keypad or a keyboard, a touch panel display, voice recognition and/or biometric mechanisms, etc. Output device(s) 370 may include one or more mechanisms that output information to the user or the operator, including a display, a speaker, etc. PLMN communication interface 375 includes any type of transceiver mechanism that enables device 300 to communicate with PLMN 205. Wireless LAN communication interface 380 includes any type of transceiver mechanism that enables device 300 to communicate with wireless LAN 210.

Device 300 may perform certain operations or processes, as may be described in detail below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. Main memory 330, ROM 340, and storage device 350 may each be referred to herein as a "tangible non-transitory computer-readable medium."

The software instructions may be read into main memory 330 from another computer-readable medium, such as storage device 350, or read into main memory 330 from another device via communication interfaces 375 or 380. The software instructions contained in main memory 330 may cause processing unit 320 to perform operations or processes that will be described later. Alternatively, hardwired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only and other configurations may be implemented. Therefore, device 300 may include additional, fewer and/or different components, arranged in a different configuration, than depicted in FIG. 3. For example, if device 300 is device 105, then device 105 may include one or more additional communication interfaces, such as, for example, one or more wireless transceivers that communicate using a low power, short range wireless protocol (e.g., Bluetooth, Insteon, IrDA, Wireless USB, Z-Wave, ZigBee, and/or a Body Area Network). As another example, if device 300 is NPU 215, validation server 220, and/or invalidation server 225, then communication interfaces 375 and 380 may be replaced by a single wired or wireless communication interface for communication with network(s) 230.

FIG. 4 depicts an exemplary implementation of queues 400 that include network change event queue 120 and confirmation network status queue 125. Network change event queue 120 may store one or more tasks associated with network change events that occur at device 105. Each task may include a notification that identifies the network change event that has occurred at device 105 (e.g., Wi-Fi to PLMN, PLMN to lost, etc.). For example, if device 105 switches from a connection to PLMN 205 to a connection to wireless LAN 210, then a corresponding network change event task is stored in queue 120 that identifies the switching from a PLMN connection to a wireless LAN connection. Therefore, a task for each network change event that occurs at device 105 may be stored in queue 120. Upon retrieval of a task from queue 120, device 105 may send a toll-free data service validation request to either NPU 215 or invalidation server 225 based on the current network connection indicated by the network change event. In FIG. 4, m different network change event tasks (i.e., n_change_event_task_1 through n_change_event_task_m) are depicted as being stored in network change event queue 120, where m may be a positive integer greater than or equal to one.

Confirmation network status queue 125 may store tasks, first stored in queue 120, subsequent to a toll-free data service validation request being sent for each of the tasks. Upon retrieval of a network change event task from queue 120, device 105 sends a toll-free validation request to NPU 215 or invalidation server 225, and then immediately stores the network change event task (prior to return of any validation response), as a confirmation network change event, in confirmation network status queue 125. After a configurable delay of x seconds expires, device 105 retrieves the confirmation network change event task from queue 125, and sends a second toll-free data service validation request to NPU 215 or invalidation server 225. In FIG. 4, p different confirmation change event tasks (i.e., c_change_event_task_1 through c_change_event_task_p) are depicted as being stored in network change event queue 120, where p may be a positive integer greater than or equal to one.

Figure 5A:
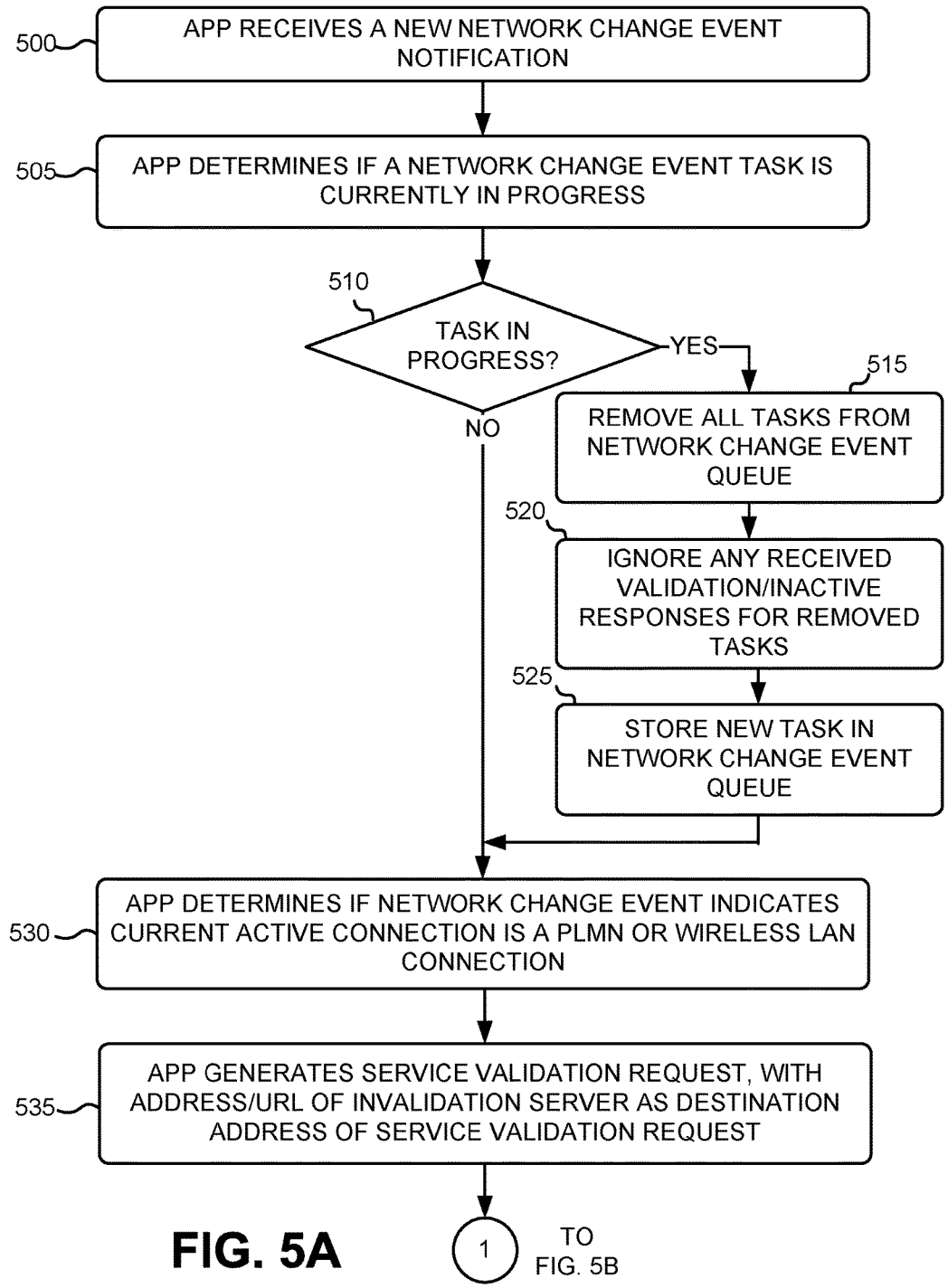
FIGS. 5A and 5B are flow diagrams illustrating an exemplary process for detecting a network change related to wireless connections between a device and at least two different wireless networks, and for managing the network change event queue of FIG. 4 for the immediate requesting of network service via the Public Land Mobile Network based on the detected network change.
Figure 5B:
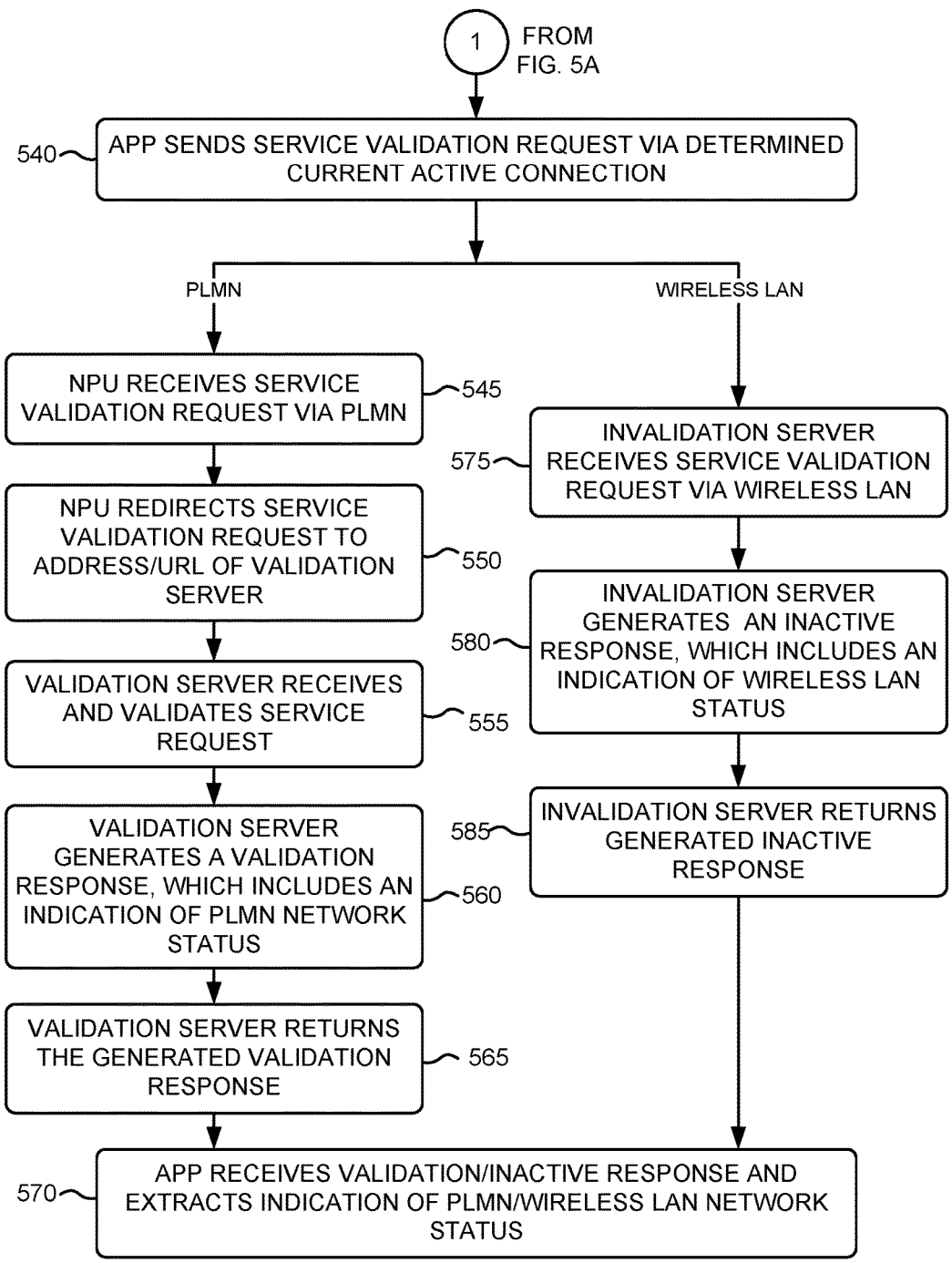

FIGS. 5A and 5B are flow diagrams illustrating an exemplary process for detecting a network change related to wireless connections between device 105 and at least two different wireless networks, and for managing network change event queue 120 for the immediate requesting of service (e.g., toll-free data service) via PLMN 205 based on the detected network change. The exemplary process of FIGS. 5A and 5B may be implemented by devices of network environment 200, including device 105, NPU 215, validation server 220 and/or invalidation server 225. The exemplary process of FIGS. 5A and 5B is described with reference to the messaging diagrams of FIGS. 6A and 6B.

Figure 6A:
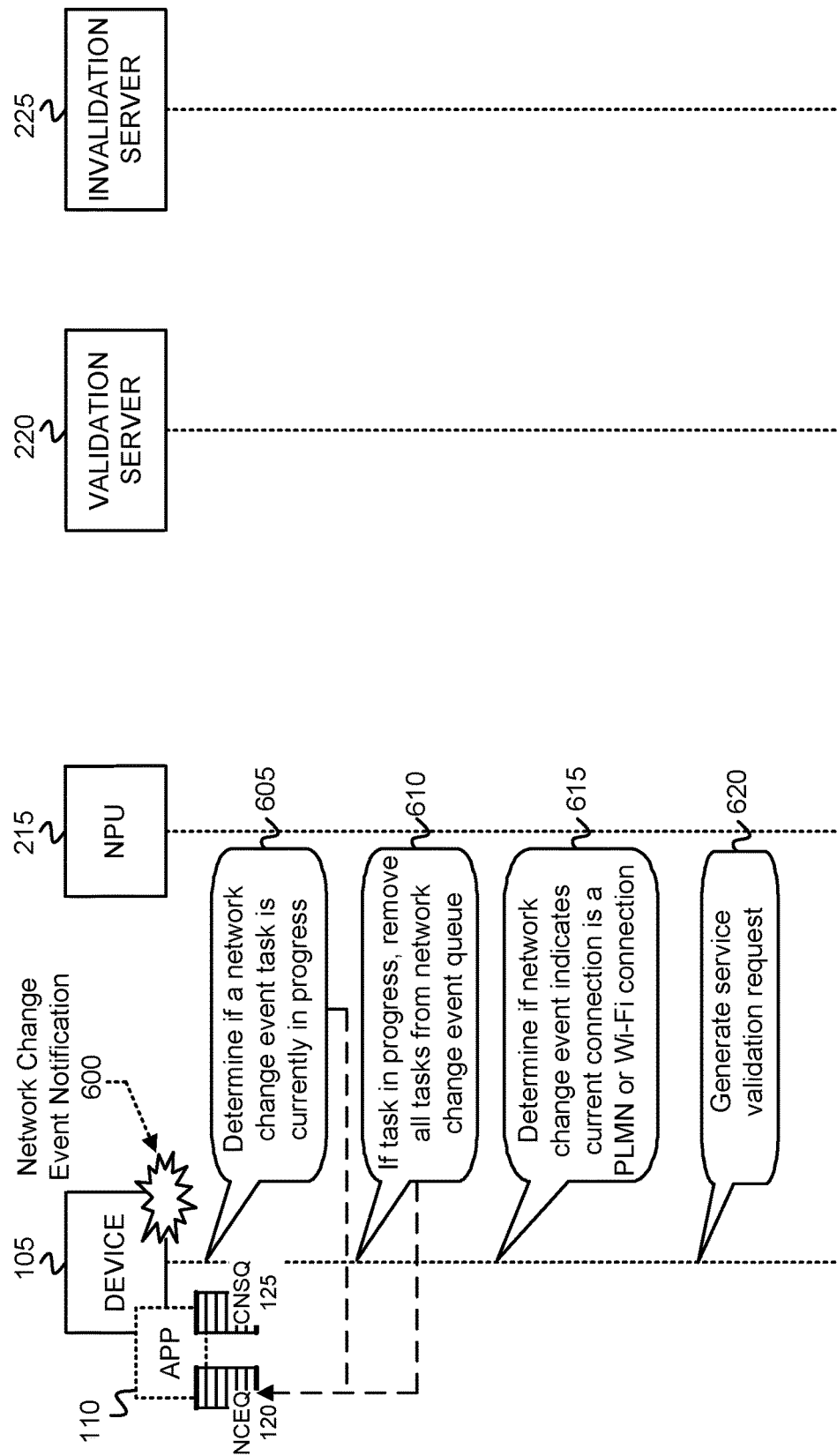
FIGS. 6A and 6B are exemplary messaging diagrams associated with the process of FIGS. 5A and 5B.

The exemplary process includes app 110 receiving a new network change event notification (block 500). Device 105 may establish and maintain one or more wireless connections via PLMN communication interface 375 and wireless LAN communication interface 380. When a wireless connection via wireless LAN communication interface 380 is lost, device 105 may establish a wireless connection via PLMN communication interface 375. Alternatively, when a wireless connection via PLMN communication interface 375 is lost, device 105 may establish a wireless connection via wireless LAN communication interface 380. As yet another alternative, device 105 may simultaneously maintain wireless connections via PLMN communication interface 375 and wireless LAN communication interface 380, but selectively choose one of the two wireless connections as the "active" connection over which data is currently transmitted and/or received. For example, wireless LAN communication interface 380 may be set as the "default" active wireless connection for sending/receiving data via wireless LAN 210, but, when the wireless connection between wireless LAN communication interface 380 and wireless LAN 210 is lost (e.g., device 105 moves out of range of wireless LAN 210), then device 105 may change the active wireless connection to the wireless connection between PLMN communication interface 375 and PLMN 205. Upon changing the active wireless connection in this manner, app 110 may receive a new network change event notification indicating the change in active wireless connection between wireless LAN 210 and PLMN 205. FIG. 6A depicts app 110 at device 105 receiving a network change event notification 600, indicating a change in wireless network connection at device 105.

App 110 determines if a network change event task, corresponding to a previous network change event, is currently in progress (block 505). A network change event task may be "in progress" if app 110 previously received a network change event notification, stored a task corresponding to the network change event in network change event queue 120, caused a toll-free validation request to be sent, and is still awaiting the return of a response to the validation request from either validation server 220 or invalidation server 225. If a network change event task is currently in progress (YES—block 510), then app 110 removes (block 515) all tasks from network change event queue 120, ignores any subsequently received validation or inactive responses from servers 220 or 225 for tasks removed from queue 120 (block 520), and stores a new network change event task in network change event queue 120 (block 525). FIG. 6A depicts app 110 at device 105 determining 605 if a network change event task is currently in progress, and if a task is currently in progress, app 110 at device 105 removes 610 all tasks from network change event queue 120.

If there is no network change event task currently in progress (NO—block 510), then app 110 determines if the network change event, corresponding to the notification received in block 500, indicates that a current "active" connection is a PLMN or a wireless LAN connection (block 530). There may be no network change event task "in progress" if app 110 has not previously received any network change event notification(s), or if app 110 has previously received a network change notification(s) but a response to the validation request(s) was already received at device 105 from validation server 220 or invalidation server 225. App 110 may determine, based on the network change event indicated by the notification, the wireless connection that is currently considered "active" with a particular external network. For example, if PLMN communication interface 375 previously established a valid wireless connection with PLMN network 205 simultaneously with wireless LAN communication interface 380 establishing a valid wireless connection with wireless LAN 210, but the wireless LAN communication interface 380 subsequently loses its connection with wireless LAN 210, then device 105 may identify the wireless connection with PLMN network 205 as the "active" network connection. In such a case, device 105 may generate a network change notification indicating that the active network connection has changed from wireless LAN 210 to PLMN network 205. FIG. 6A depicts app 110 at device 105 determining 615 if the network change event associated with the received notification 600 indicates that the current network connection is either a PLMN or a wireless LAN (e.g., Wi-Fi) connection.

App 110 generates a service validation request, with an address and/or Uniform Resource Locator (URL) of invalidation server 225 as the destination address of the service validation request (block 535). The default destination of the service validation request may include invalidation server 225 such that app 110 inserts the network address and/or ULR of invalidation server 225, as the destination node, in each service validation request prior to sending the service validation request via the current active wireless connection. App 110 sends the service validation request via the determined current active connection (block 540). Thus, if the active wireless connection from device 105 is a connection to PLMN 205, then device 105 sends the service validation request via PLMN 205 towards the destination invalidation server 225. Alternatively, if the active wireless connection from device 105 is a connection to wireless LAN 210, then device 105 sends the service validation request via wireless LAN 210 towards the destination invalidation server 225. FIG. 6A depict app 110 at device 105 generating 620 a service validation request. If the current active connection is a connection via PLMN 205, then the exemplary process continues with blocks 545-565 of FIG. 5B. If the current active connection is a connection via wireless LAN 210, then the exemplary process continues with blocks 575-585.

Figure 6B:
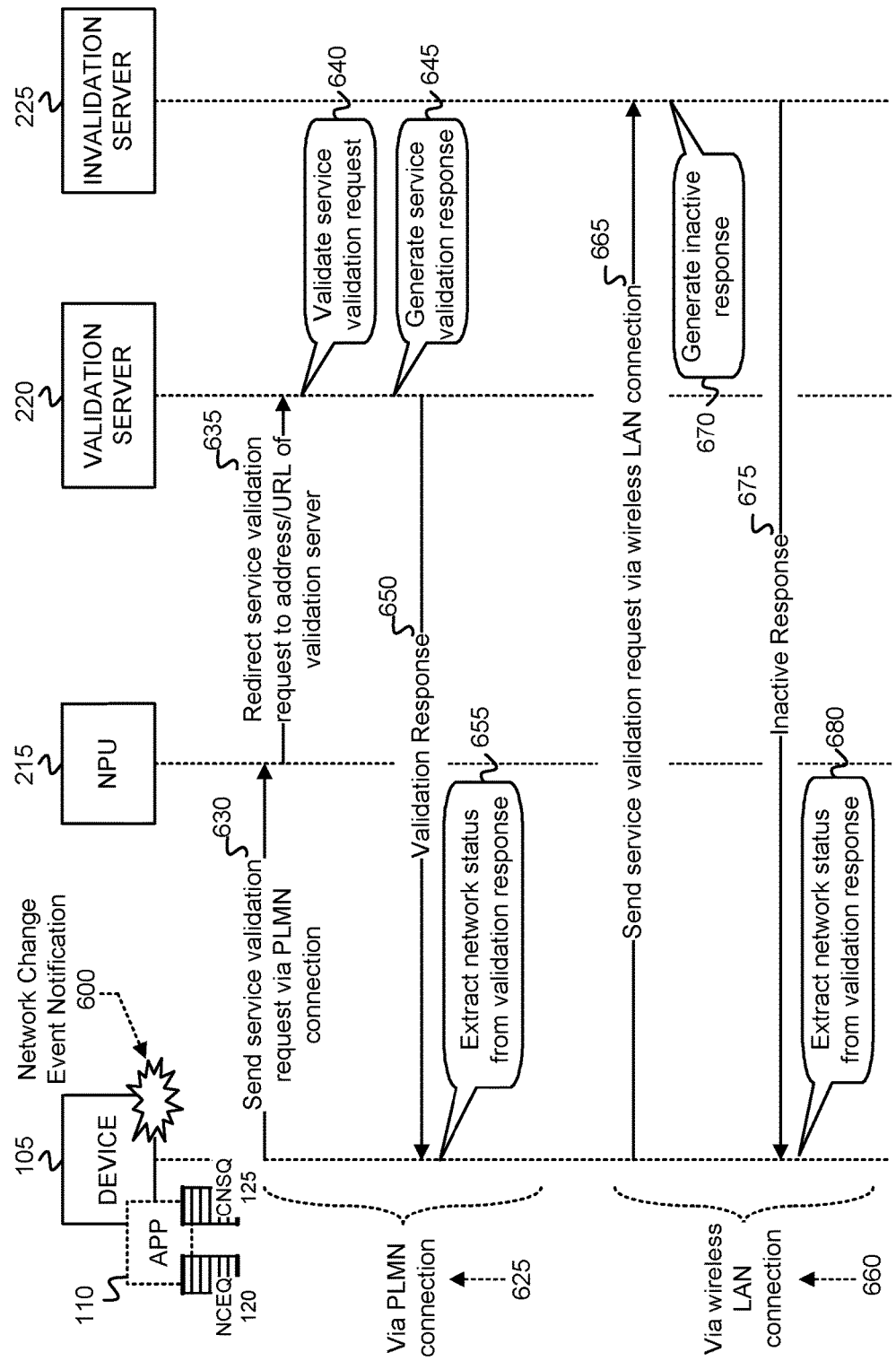

At block 545, if the current active connection is a connection via PLMN 205, NPU 215 receives the service validation request via PLMN 205 (block 545), and redirects the service validation request to the address and/or URL of validation server 220 (block 550). When transmitted from device 105, the service validation request is forwarded through PLMN 205 to a Packet Gateway (PGW) that connects PLMN 205 to network(s) 230. The PGW then forwards the service validation request to NPU 215, which may reside just behind the PGW in network(s) 230. NPU 215 receives the service validation request, and replaces the address/URL of invalidation server 225 with the address/URL of validation server 220 such that the service validation request, originally destined for invalidation server 225, is redirected to validation server 220. FIG. 6B depicts exemplary messaging 625 associated with sending the service validation request via the PLMN connection from device 105. For example, as shown in FIG. 6B, app 110 sends 630 the service validation request via the PLMN connection, where, upon receipt at NPU 215 after transiting PLMN 205, NPU 215 redirects 635 the service validation request to the address/URL of validation server 220.

Validation server 220 receives and validates the service request (block 555), and generates a validation response, which includes an indication of PLMN network status (block 560), and returns the generated validation response to device 105 (block 565). The indication of the PLMN network status may be included in a header (e.g., Hypertext Transfer Protocol (HTTP) header) of the validation response. FIG. 6B depicts validation server 220, upon receipt of service validation request 635, validating 640 the service validation request from device 105. Validation of the request for toll-free data may include various techniques for verifying the identity of device 105, or of a user of device 105. Subsequent to completion of the validation 640 of the service validation request 635, validation server 220, as further depicted in FIG. 6B, generates 645 a service validation response message 650, and sends the validation response message 650 to device 105. The validation response message 650 may include a grant of toll-free data service to device 105. The grant of toll-free data service may include a grant of a quantity of toll-free data (e.g., 50 Megabytes (MB)), communicated via PLMN 205, that is valid for a specified period of time (e.g., 4 hours). Device 105 may, upon receipt of the grant of the toll-free data service, transmit and/or receive the granted quantity of data via PLMN 205 during the period of time specified by the validation response message 650. Alternatively, the grant of toll-free data service may include a grant of a quantity of toll-free data for only a current communication session with a particular destination node. Subsequent to grant of the toll-free data service, device 105 may, therefore, engage in toll-free communication via PLMN 205 for a particular session, for a specified quantity of data, and/or for a certain period of time.

App 110, at device 105, receives the validation response and extracts the indication of the PLMN network status from the validation response (block 570). The PLMN network status may indicate that PLMN 205 is acknowledged as the current active connection to device 105, and the wireless connection via which data can currently be transmitted and/or received at device 105. FIG. 6B depicts app 110 at device 105 receiving the validation response message 650 from validation server 220, and extracting 655 the network status from the validation response message 650.

At block 575, if the current active connection is a connection via wireless LAN 210, invalidation server 225 receives the service validation request via wireless LAN 210. When transmitted from device 105, the service validation request is forwarded through wireless LAN 210 and network(s) 230 to invalidation server 225 based on the address/URL of invalidation server 225 included within the service validation request. Invalidation server 220 generates an inactive response, which includes an indication of wireless LAN status (block 580). Invalidation server 220 returns the generated inactive response to device 105 (block 585), and app 110, at device 105, receives the inactive response and extracts the indication of wireless LAN network status (block 570). The wireless LAN network status may indicate that wireless LAN 210 is acknowledged as the current active connection to device 105, and the wireless connection via which data can currently be transmitted and/or received at device 105. The indication of the wireless LAN network status may be included in a header (e.g., HTTP header) of the validation response, such that the header has a different, identifiable content than the header of the validation response of block 560. FIG. 6B depicts exemplary messaging 660 associated with sending the service validation request via the wireless LAN connection from device 105.

For example, as shown in FIG. 6B, app 110 sends 665 the service validation request via the wireless LAN connection to invalidation server 225, where, upon receipt at invalidation server 225 after transiting wireless LAN 210 and network(s) 230, invalidation server 225 generates 670 an inactive response, and sends the inactive response 675 to device 105. FIG. 6B further depicts app 110 at device 105 receiving the inactive response message 675 from invalidation server 225, and extracting 680 the network status from the inactive response message 650. Inactive response message 675 may indicate that network service (e.g., toll-free network data service via PLMN 205) is not currently granted, or available, to device 105 since device 105 has an active wireless connection via wireless LAN 210 (e.g., the Wi-Fi network).

The exemplary process of FIGS. 5A and 5B may be executed for each new network change event that occurs at device 105. Therefore, multiple instances of the process of FIGS. 5A and 5B may be executing in parallel with one another, with network change event queue 120 storing a new task for each new network change event. Multiple instances of the process of FIGS. 5A and 5B may, therefore, be executing in parallel at any point in time for multiple different network change events.

Figure 7A:
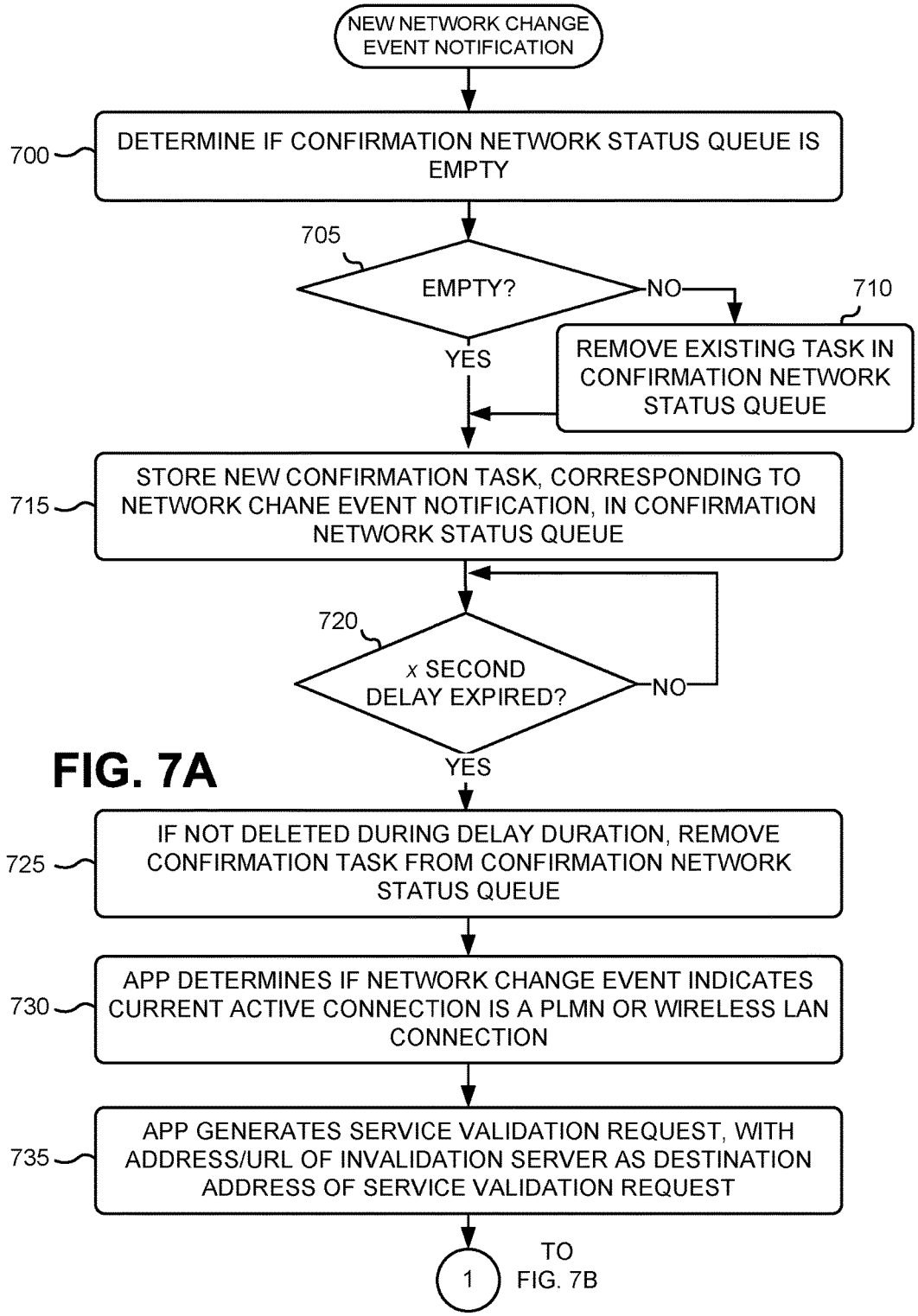
FIGS. 7A and 7B are flow diagrams illustrating an exemplary process for confirming a network change related to wireless connections between a device and at least two different wireless networks, and for managing the confirmation network status queue of FIG. 4 for a time delayed validation of network status for use in the requesting of network service via the Public Land Mobile Network.
Figure 7B:
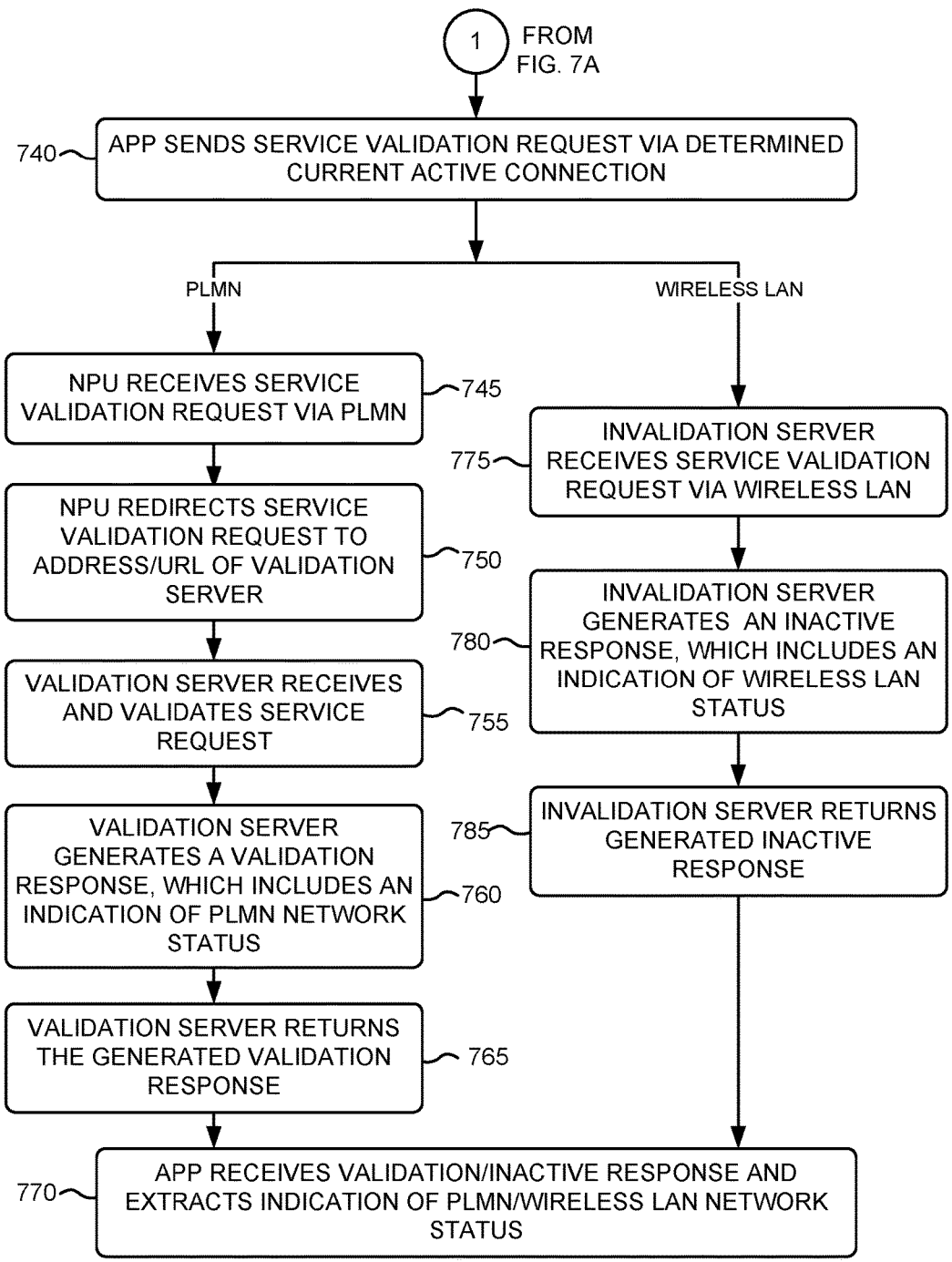

FIGS. 7A and 7B are flow diagrams illustrating an exemplary process for confirming a network change related to wireless connections between device 105 and at least two different wireless networks, and for managing confirmation network status queue 125 for a time delayed validation of device network status for use in requesting of service (e.g., toll-free data service) via PLMN 205. The exemplary process of FIGS. 7A and 7B may be implemented by devices of network environment 200, including device 105, NPU 215, validation server 220 and/or invalidation server 225. The exemplary process of FIGS. 7A and 7B is described with reference to the messaging diagrams of FIGS. 8A-8C. The exemplary process of FIGS. 7A and 7B may be initiated upon receipt of each new network change event notification in block 500 of FIG. 5A and after execution of blocks 540 or 555 of FIG. 5B. Therefore, each instance of execution of the process of FIGS. 7A and 7B occurs based on the receipt of a new network change event notification (i.e., block 500 of FIG. 5A) and based on sending a service validation request in block 540, or block 555, of FIG. 5B.

Figure 8A:
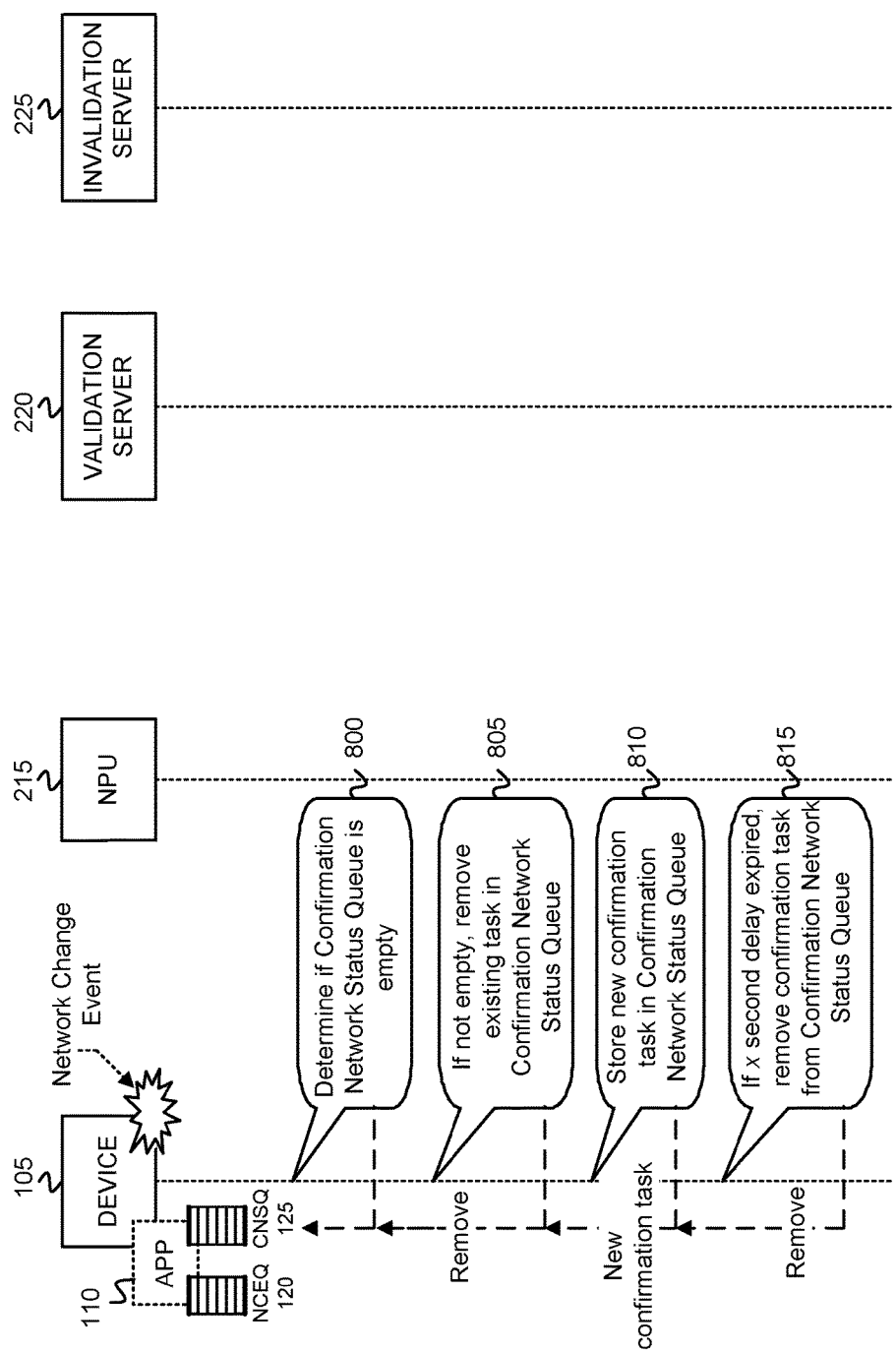

The exemplary process includes app 110 determining if confirmation network status queue 125 is empty (block 700). A confirmation network change event may have been previously stored in queue 125, and app 110 checks queue 125 to verify whether queue 125 stores a previous network change event, or whether queue 125 is empty. If confirmation network status queue 125 is not empty (NO—block 705), then app 110 removes and deletes an existing task stored in confirmation network status queue 125 (block 710). FIG. 8A depicts app 110 at device 105 determining 800 if confirmation network status queue 125 is empty, and removing 805 an existing task in queue 125 if queue 125 is not empty. If confirmation network status queue 125 is empty (YES—block 705), then app 110 stores a new confirmation task in confirmation network status queue 125 (block 715). App 110 at device 105 identifies the network change event task for which a validation response was requested in block 540, or in block 555, and stores the network change event task as a new confirmation change event task in queue 125. FIG. 8A depicts app 110 at device 105 storing 810 a new confirmation network change event task in queue 125 if queue 125 is empty.

Once the new confirmation task is stored in queue 125, app 110 determines if an x second delay has expired (block 720). The x second delay may include a configurable delay, the duration of which may be varied or changed by a user of device 105, or by an administrator and/or operator of PLMN 205. During the delay period, one or more subsequent network change events may occur with a corresponding task being stored in queue 125 via a parallel, executing instance of the process of FIGS. 7A and 7B. The most recent of the subsequent network change events is stored in queue 125, and the remainder that have occurred during the delay period are deleted.

If the x second delay has not yet expired (NO—block 720), app 110 waits until the x second delay has expired. If the x second delay has expired (YES—block 720), then app 110 removes the confirmation task stored in confirmation network status queue 125 if the confirmation task has not already been deleted during the x second delay (block 725). The exemplary process of FIGS. 7A and 7B, for subsequent, different received network change event notifications that occur during the x second delay, may be executed in parallel with the current process and, during that parallel process, the confirmation network change event stored in queue 125 may be deleted and replaced with one corresponding to a more recent network change event notification. If the confirmation task stored in queue 125 in block 715 of the current process is deleted during the duration of the x second delay, then the current process may be terminated upon deletion of the confirmation task from queue 125. A process for the subsequent, different network change event tasks being executed in parallel may, however, continue executing. FIG. 8A depicts app 110 at device 105 removing 815 the confirmation task, stored in queue 125 in block 550, from queue 125.

Figure 8B:
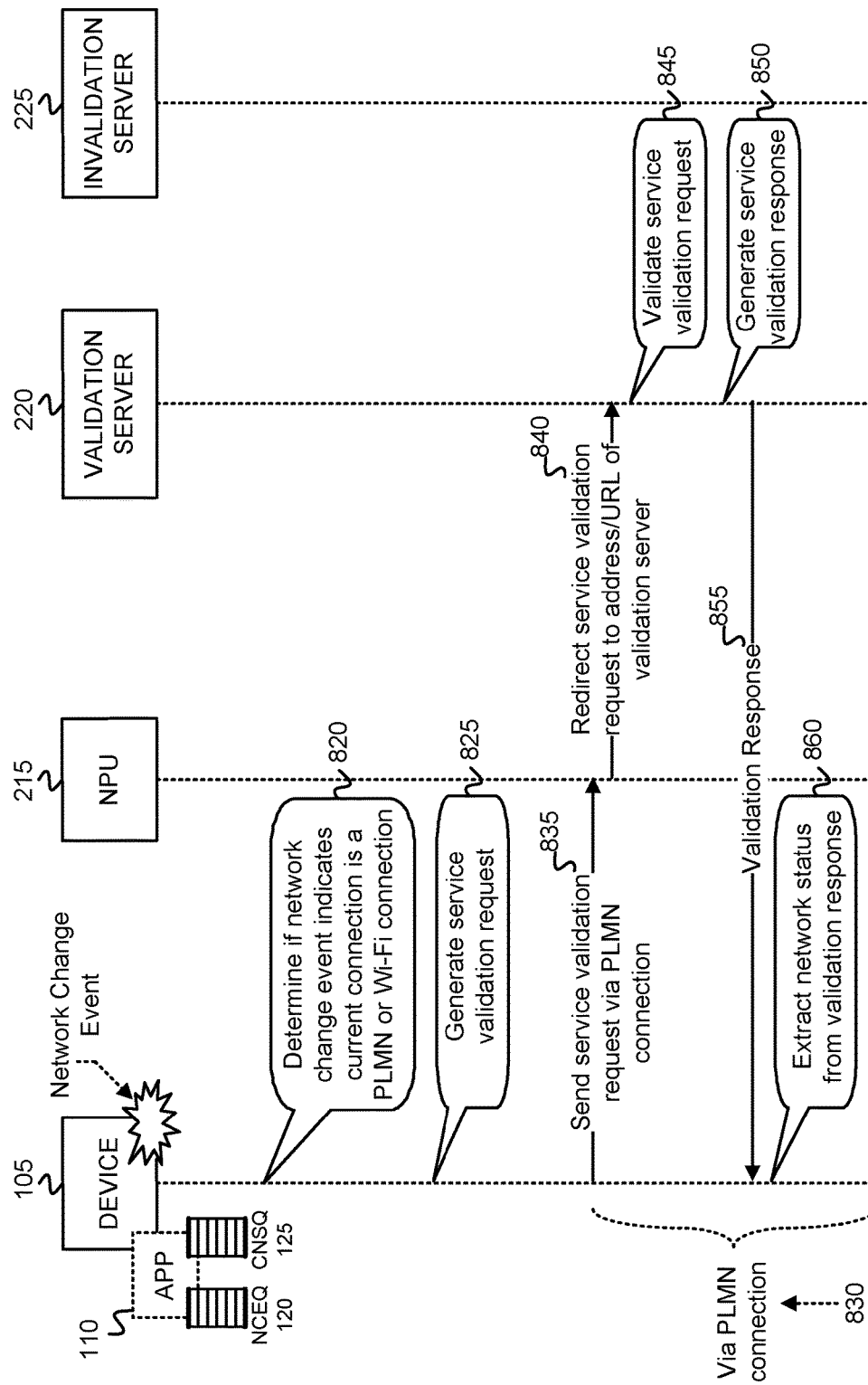

App 110 determines if the network change event, associated with the removed confirmation task, indicates that a current connection is a PLMN or a wireless LAN connection (block 730). FIG. 8B depicts app 110 at device 105 determining 820 if the confirmation network change event, associated with the task removed from queue 125 in block 725, indicates that the current active wireless connection at device 105 is a PLMN or a Wi-Fi connection. App 110 may determine, based on the network change event associated with the removed confirmation task, the wireless connection that is currently considered "active" with a particular external network. For example, if PLMN communication interface 375 previously established a valid wireless connection with PLMN network 205 simultaneously with wireless LAN communication interface 380 establishing a valid wireless connection with wireless LAN 210, but the wireless LAN communication interface 380 subsequently loses its connection with wireless LAN 210, then device 105 may identify the wireless connection with PLMN network 205 as the "active" network connection. In such a case, device 105 may generate a network change notification indicating that the active network connection has changed from wireless LAN 210 to PLMN network 205.

App 110 generates a service validation request, with an address and/or Uniform Resource Locator (URL) of invalidation server 225 as the destination address of the service validation request (block 735). The default destination of the service validation request may include invalidation server 225 such that app 110 inserts the network address and/or ULR of invalidation server 225, as the destination node, in each service validation request prior to sending the service validation request via the current active wireless connection. App 110 sends the service validation request via the determined current active connection (block 740). Thus, if the active wireless connection from device 105 is a connection to PLMN 205, then device 105 sends the service validation request via PLMN 205 towards the destination invalidation server 225. Alternatively, if the active wireless connection from device 105 is a connection to wireless LAN 210, then device 105 sends the service validation request via wireless LAN 210 towards the destination invalidation server 225. FIG. 8B depicts app 110 at device 105 generating 825 a service validation request. If the current active connection is a connection via PLMN 205, then the exemplary process continues with blocks 745-765 of FIG. 7B. If the current active connection is a connection via wireless LAN 210, then the exemplary process continues with blocks 775-785 of FIG. 7B.

At block 745, if the current active connection is a connection via PLMN 205, NPU 215 receives the service validation request via PLMN 205, and redirects the service validation request to the address and/or URL of validation server 220 (block 750). When transmitted from device 105, the service validation request is forwarded through PLMN 205 to a Packet Gateway (PGW) that connects PLMN 205 to network(s) 230. The PGW then forwards the service validation request to NPU 215, which may reside just behind the PGW in network(s) 230. NPU 215 receives the service validation request, and replaces the address/URL of invalidation server 225 with the address/URL of validation server 220 such that the service validation request, originally destined for invalidation server 225, is redirected to validation server 220. FIG. 8B depicts exemplary messaging 830 associated with sending the service validation request via the PLMN connection from device 105. For example, as shown in FIG. 8B, app 110 sends 835 the service validation request via the PLMN connection, where, upon receipt at NPU 215 after transiting PLMN 205, NPU 215 redirects 840 the service validation request to the address/URL of validation server 220.

Validation server 220 receives and validates the service request (block 755), and generates a validation response, which includes an indication of PLMN network status (block 760), and returns the generated validation response to device 105 (block 765). The indication of the PLMN network status may be included in a header (e.g., HTTP header) of the validation response. FIG. 8B depicts validation server 220, upon receipt of service validation request 840, validating 845 the service validation request from device 105. Validation of the request for the service validation request (e.g., request for toll-free network data service) may include various techniques for verifying the identity of device 105, or of a user of device 105. Subsequent to completion of the validation 845 of the service validation request 840, validation server 220, as further depicted in FIG. 8B, generates 850 a service validation response message 855, and sends the validation response message 855 to device 105. The validation response message 855 may include a grant of toll-free data service to device 105. The grant of toll-free data service may include a grant of a quantity of toll-free data (e.g., 50 Megabytes (MB)), communicated via PLMN 205, that is valid for a specified period of time (e.g., 4 hours). Device 105 may, upon receipt of the grant of the toll-free data service, transmit and/or receive the granted quantity of data via PLMN 205 during the period of time specified by the validation response message 650. Alternatively, the grant of toll-free data service may include a grant of a quantity of toll-free data for only a current communication session with a particular destination node. Subsequent to grant of the toll-free data service, device 105 may, therefore, engage in toll-free communication via PLMN 205 for a particular session, for a specified quantity of data, and/or for a certain period of time.

App 110, at device 105, receives the validation response and extracts the indication of the PLMN network status from the validation response (block 770). The PLMN network status may indicate that PLMN 205 is acknowledged as the current active connection to device 105, and the wireless connection via which data can currently be transmitted and/or received at device 105. FIG. 8B depicts app 110 at device 105 receiving the validation response message 855 from validation server 220, and extracting 860 the network status from the validation response message 650.

At block 775, if the current active connection is a connection via wireless LAN 210, invalidation server 225 receives the service validation request via wireless LAN 210. When transmitted from device 105, the service validation request is forwarded through wireless LAN 210 and network(s) 230 to invalidation server 225 based on the address/URL of invalidation server 225 included within the service validation request. Invalidation server 220 generates an inactive response, which includes an indication of wireless LAN status (block 780). Invalidation server 220 returns the generated inactive response to device 105 (block 785), and app 110, at device 105, receives the inactive response and extracts the indication of wireless LAN network status (block 770). The wireless LAN network status may indicate that wireless LAN 210 is acknowledged as the current active connection to device 105, and the wireless connection via which data can currently be transmitted and/or received at device 105. The indication of the wireless LAN network status may be included in a header (e.g., HTTP header) of the validation response, such that the header has a different, identifiable content than the header of the validation response of block 760. FIG. 8C depicts exemplary messaging 865 associated with sending the service validation request via the wireless LAN connection from device 105. For example, as shown in FIG. 8C, app 110 sends 870 the service validation request via the wireless LAN connection to invalidation server 225, where, upon receipt at invalidation server 225 after transiting wireless LAN 210 and network(s) 230, invalidation server 225 generates 875 an inactive response 880, and sends the inactive response 880 to device 105. FIG. 8C further depicts app 110 at device 105 receiving the inactive response message 880 from invalidation server 225, and extracting 885 the network status from the inactive response message 885. Inactive response message 885 may indicate that network service (e.g., toll-free network data service via PLMN 205) is not currently granted, or available, to device 105 since device 105 has an active wireless connection via wireless LAN 210 (e.g., the Wi-Fi network).

The exemplary process of FIGS. 7A and 7B may be executed for each network change event that occurs at device 105. Therefore, multiple instances of the process of FIGS. 7A and 7B may be executing in parallel with one another.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 5A and 5B, and FIGS. 7A and 7B, and message/operation flows with respect to FIGS. 1, 6A and 6B, and 8A-8C, the order of the blocks and/or message/operation flows may be modified or varied in other implementations. Further, non-dependent blocks may be performed in parallel. Exemplary embodiments have been described herein as applying to the provision of toll-free network data service based on network change events (i.e., network switching) occurring at wireless devices. In other embodiments, however, other types of network services may be provided based on detected network change events occurring at wireless devices.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, at a wireless communications device, a first connection status associated with a Public Land Mobile Network (PLMN) communication interface and a wireless Local Area Network (LAN) communication interface of the device;
   storing the first connection status in a first queue;
   sending a first toll-free data service validation request to a first or a second server associated with a PLMN;
   determining a second connection status of the PLMN communication interface and the wireless LAN communication interface;
   storing the second connection status in a second queue;
   waiting, subsequent to storing the second connection status, for expiration of a time delay;
   retrieving, subsequent to the expiration of the time delay, the second connection status or a third connection status from the second queue;
   sending, based on the retrieved second or third connection status, a second toll-free data service validation request to the first or the second server associated with the PLMN;

receiving from the first or second server, in response to the toll-free data service validation request, a validation response that authorizes toll-free data communication with the wireless communications device via the PLMN; and engaging, by the wireless communications device, in the toll-free data communication via the PLMN based on the receipt of the validation response.

2. The method of claim 1, wherein the first connection status is associated with a change in an active wireless connection at the wireless communications device.

3. The method of claim 2, further comprising:
determining that the wireless LAN communication interface has lost a wireless connection to a wireless LAN;
determining that the PLMN communication interface has a valid wireless connection to the PLMN; and
identifying a change in the active wireless connection from the wireless connection to the wireless LAN to the valid wireless connection to the PLMN.

4. The method of claim 1, wherein determining the first connection status associated with the PLMN communication interface and the wireless LAN communication interface of the device comprises:
determining if the PLMN communication interface has a valid wireless connection to the PLMN; and
determining if the wireless LAN communication interface has a valid wireless connection to a wireless LAN.

5. The method of claim 4, wherein determining the first connection status associated with the PLMN communication interface and the wireless LAN communication interface further comprises:
selecting, if the wireless LAN communication interface has the valid wireless connection to the wireless LAN, the wireless LAN communication interface as the active communication interface for data communication; and
selecting, if the wireless LAN communication interface does not have a valid wireless connection to the wireless LAN, the PLMN communication interface as the active communication interface for data communication.

6. The method of claim 1, further comprising:
determining, during the waiting for the expiration of the time delay, the third connection status associated with the PLMN communication interface and the wireless LAN communication interface;
deleting the second connection status from the second queue; and
storing the third connection status in the second queue.

7. The method of claim 6, wherein the third connection status is associated with a change in active wireless connections at the wireless communications device that occurs during the waiting for the expiration of the time delay.

8. A wireless communications device, comprising:
a Public Land Mobile Network (PLMN) communication interface configured to connect to a PLMN;
a wireless Local Area Network (LAN) communication interface configured to connect to a LAN;
one or more memory devices configured to store a first queue and a second queue; and
a processing unit configured to:
determine a first connection status associated with the PLMN communication interface and the wireless LAN communication interface,
store the first connection status in the first queue,
cause a first service validation request to be sent to a first or a second server associated with the PLMN,
determine a second connection status of the PLMN communication interface and the wireless LAN communication interface,
store the second connection status in the second queue;
wait, subsequent to storing the second connection status, for expiration of a time delay,
retrieve, subsequent to the expiration of the time delay, the second connection status or a third connection status from the second queue,
cause, based on the retrieved second or third connection status, a second service validation request to be sent to the first or the second server associated with the PLMN,
receive from the first or the second server, in response to the second service validation request, a validation response that authorizes service delivery to, and from, the wireless communications device via the PLMN, and
engage in the authorized service delivery, via the PLMN and the PLMN communication interface, based on the receipt of the validation response.

9. The wireless communications device of claim 8, wherein the first connection status is associated with a change in an active wireless connection at the wireless communications device.

10. The wireless communications device of claim 9, wherein, when determining the first connection status or the second connection status, the processing unit is further configured to:
determine that the wireless LAN communication interface has lost a wireless connection to the wireless LAN;
determine that the PLMN communication interface has a valid wireless connection to the PLMN; and
identify a change in the active wireless connection from the wireless connection to the wireless LAN to the wireless connection to the PLMN.

11. The wireless communications device of claim 8, wherein, when determining the first connection status associated with the PLMN communication interface and the wireless LAN communication interface of the device, the processing unit is further configured to:
determine if the PLMN communication interface has a valid wireless connection to the PLMN, and
determine if the wireless LAN communication interface has a valid wireless connection to a wireless LAN.

12. The wireless communications device of claim 11, wherein, when determining the first connection status associated with the PLMN communication interface and the wireless LAN communication interface, the processing unit is further configured to:
select, if the wireless LAN communication interface has the valid wireless connection to the wireless LAN, the wireless LAN communication interface as the active communication interface for data communication, and
select, if the wireless LAN communication interface does not have a valid wireless connection to the wireless LAN, the PLMN communication interface as the active communication interface for data communication.

13. The wireless communications device of claim 8, wherein the processing unit is further configured to:
determine, during the waiting for the expiration of the time delay, the third connection status of the PLMN communication interface and the wireless LAN communication interface,
delete the second connection status from the second queue, and
store the third connection status in the second queue, wherein the third connection status is associated with a change in active wireless connections at the wireless communications device that occurs during the waiting for the expiration of the time delay.

14. The wireless communications device of claim 8, wherein the first and the second service validation requests comprise toll-free data service validation requests and wherein the validation response authorizes toll-free data service communication via the PLMN.

15. A non-transitory storage medium storing instructions executable by a wireless communications device, wherein the instructions comprise instructions to:
    determine a first connection status associated with a Public Land Mobile Network (PLMN) communication interface and a wireless Local Area Network (LAN) communication interface of the wireless communications device;
    store the first connection status in a first queue;
    send a first service validation request to a first or a second server associated with a PLMN;
    determine a second connection status of the PLMN communication interface and the wireless LAN communication interface;
    store the second connection status in a second queue;
    wait, subsequent to storing the second connection status, for expiration of a time delay;
    retrieve, subsequent to the expiration of the time delay, the second connection status or a third connection status from the second queue;
    send, based on the retrieved second or third connection status, a second service validation request to the first or the second server associated with the PLMN;
    receive, in response to the second service validation request from the first or the second server, a validation response that authorizes service delivery to, and from, the wireless communications device via the PLMN; and
    engage, by the wireless communications device, in the authorized service delivery via the PLMN based on the receipt of the validation response.

16. The non-transitory storage medium of claim 15, wherein the first connection status is associated with a change in an active wireless connection at the wireless communications device.

17. The non-transitory storage medium of claim 16, wherein the instructions further comprise instructions to:
    determine that the wireless LAN communication interface has lost a wireless connection to a wireless LAN;
    determine that the PLMN communication interface has a valid wireless connection to the PLMN; and
    identify a change in the active wireless connection from the wireless connection to the wireless LAN to the wireless connection to the PLMN.

18. The non-transitory storage medium of claim 15, wherein the instructions to determine the first connection status associated with the PLMN communication interface and the wireless LAN communication interface of the wireless communications device further comprise instructions to:
    determine if the PLMN communication interface has a valid wireless connection to the PLMN; and
    determine if the wireless LAN communication interface has a valid wireless connection to a wireless LAN.

19. The non-transitory storage medium of claim 18, wherein the instructions to determine the first connection status associated with the PLMN communication interface and the wireless LAN communication interface further comprise instructions to:
    select, if the wireless LAN communication interface has the valid wireless connection to the wireless LAN, the wireless LAN communication interface as the active communication interface for data communication; and
    select, if the wireless LAN communication interface does not have a valid wireless connection to the wireless LAN, the PLMN communication interface as the active communication interface for data communication.

20. The non-transitory storage medium of claim 15, further comprising instructions to:
    determine, during the waiting for the expiration of the time delay, the third connection status of the PLMN communication interface and the wireless LAN communication interface;
    delete the second connection status from the second queue; and
    store the third connection status in the second queue,
    wherein the third connection status is associated with a change in active wireless connections at the wireless communications device that occurs during the waiting for the expiration of the time delay.

* * * * *